US008082574B2

(12) United States Patent
Hoff et al.

(10) Patent No.: US 8,082,574 B2
(45) Date of Patent: Dec. 20, 2011

(54) ENFORCING SECURITY GROUPS IN NETWORK OF DATA PROCESSORS (75) Inventors: Brandon L. Hoff, Greenwood Village, CO (US); Ronald B. Willis, Raleigh, NC (US); Charles R. Starrett, Cary, NC (US); Donald K. McAlister, Apex, NC (US)

(73) Assignee: Certes Networks, Inc., Pittsburgh, PA (US)

( * ) Notice: Subject to any disclaimer, the term of this patent is extended or adjusted under 35 U.S.C. 154(b) by 278 days.

(21) Appl. No.: 11/880,890

(22) Filed: Jul. 23, 2007

(65) Prior Publication Data
US 2008/0040775 A1 Feb. 14, 2008

Related U.S. Application Data (60) Provisional application No. 60/837,410, filed on Aug. 11, 2006.

(51) Int. Cl.
*H04L 29/06* (2006.01)

(52) U.S. Cl. .......................................................... 726/1

(58) Field of Classification Search ...................... 726/1
See application file for complete search history.

(56) References Cited

U.S. PATENT DOCUMENTS

| 4,200,770 | A | 4/1980 | Hellman et al. |
| 5,237,611 | A | 8/1993 | Rasmussen et al. |
| 5,577,209 | A | 11/1996 | Boyle et al. |
| 5,812,671 | A | 9/1998 | Ross, Jr. |
| 5,835,726 | A | 11/1998 | Shwed et al. |
| 5,870,475 | A | 2/1999 | Allan et al. |
| 5,940,591 | A | 8/1999 | Boyle et al. |
| 6,035,405 | A | 3/2000 | Gage et al. |
| 6,061,600 | A | 5/2000 | Ying |
| 6,173,399 | B1 | 1/2001 | Gilbrech |
| 6,185,680 | B1 | 2/2001 | Shimbo et al. |
| 6,275,859 | B1 | 8/2001 | Wesley et al. |
| 6,330,562 | B1 | 12/2001 | Boden et al. |
| 6,351,536 | B1 | 2/2002 | Sasaki |
| 6,484,257 | B1 | 11/2002 | Ellis |
| 6,539,483 | B1 | 3/2003 | Harrison et al. |
| 6,556,547 | B1 | 4/2003 | Srikanth et al. |
| 6,578,076 | B1 * | 6/2003 | Putzolu .......................... 709/223 |
| 6,591,150 | B1 | 7/2003 | Shirota |
| 6,658,114 | B1 | 12/2003 | Farn et al. |
| 6,697,857 | B1 | 2/2004 | Dixon et al. |
| 6,708,273 | B1 | 3/2004 | Ober et al. |
| 6,711,679 | B1 | 3/2004 | Guski et al. |
| 6,823,462 | B1 | 11/2004 | Cheng et al. |
| 6,915,437 | B2 | 7/2005 | Swander et al. |

(Continued)

OTHER PUBLICATIONS

Frankel, S. "Demystifying the IPsec Puzzle," *Artech House*, Ch. 5, pp. 87-127, Ch. 9, pp. 179-205 (2001).

(Continued)

*Primary Examiner* — Michael S McNally
(74) *Attorney, Agent, or Firm* — Hamilton, Brook, Smith & Reynolds, P.C.

(57) ABSTRACT

A technique for securing message traffic in a data network using various methods for distributing security policies and keys, where policy definition is determined in a Management and Policy (MAP) functional layer that is responsible for policy distribution; a separate Key Authority Point (KAP) that is responsible for key generation, key distribution, and policy distribution; and a separate Policy Enforcement Point (PEP) which is responsible for enforcing the policies and applying the keys.

27 Claims, 4 Drawing Sheets

U.S. PATENT DOCUMENTS

| | | | |
|---|---|---|---|
| 6,920,559 B1 | 7/2005 | Nessett et al. | |
| 6,981,139 B2 | 12/2005 | Enokida | |
| 6,986,061 B1 | 1/2006 | Kunzinger | |
| 7,082,198 B1 | 7/2006 | Ishii | |
| 7,103,784 B1 | 9/2006 | Brown et al. | |
| 7,106,756 B1 | 9/2006 | Donovan et al. | |
| 7,373,660 B1 | 5/2008 | Guichard et al. | |
| 2002/0069356 A1* | 6/2002 | Kim | 713/160 |
| 2002/0154782 A1 | 10/2002 | Chow et al. | |
| 2002/0162026 A1 | 10/2002 | Neuman et al. | |
| 2003/0012205 A1* | 1/2003 | Foti et al. | 370/401 |
| 2003/0135753 A1 | 7/2003 | Batra | |
| 2003/0177396 A1 | 9/2003 | Bartlett et al. | |
| 2003/0182431 A1 | 9/2003 | Sturniolo et al. | |
| 2003/0191937 A1 | 10/2003 | Balissat et al. | |
| 2003/0200456 A1 | 10/2003 | Cyr et al. | |
| 2003/0233576 A1* | 12/2003 | Maufer et al. | 713/201 |
| 2004/0005061 A1 | 1/2004 | Buer et al. | |
| 2004/0044891 A1 | 3/2004 | Hanzlik et al. | |
| 2004/0062399 A1 | 4/2004 | Takase | |
| 2004/0160903 A1 | 8/2004 | Gai et al. | |
| 2004/0205342 A1* | 10/2004 | Roegner | 713/168 |
| 2004/0268124 A1 | 12/2004 | Narayanan | |
| 2005/0010765 A1 | 1/2005 | Swander et al. | |
| 2005/0066159 A1 | 3/2005 | Poussa et al. | |
| 2005/0083947 A1 | 4/2005 | Vaarala et al. | |
| 2005/0102514 A1* | 5/2005 | Bergenwall et al. | 713/168 |
| 2005/0125684 A1 | 6/2005 | Schmidt | |
| 2005/0138353 A1 | 6/2005 | Spies et al. | |
| 2005/0138369 A1 | 6/2005 | Lebovitz et al. | |
| 2005/0144439 A1 | 6/2005 | Park et al. | |
| 2005/0149732 A1 | 7/2005 | Freeman et al. | |
| 2005/0160161 A1* | 7/2005 | Barrett et al. | 709/223 |
| 2005/0190758 A1 | 9/2005 | Gai et al. | |
| 2005/0232277 A1 | 10/2005 | See | |
| 2006/0002423 A1 | 1/2006 | Rembert et al. | |
| 2006/0010324 A1 | 1/2006 | Appenzeller et al. | |
| 2006/0072748 A1 | 4/2006 | Buer | |
| 2006/0072762 A1 | 4/2006 | Buer | |
| 2006/0136437 A1* | 6/2006 | Yamasaki | 707/100 |
| 2006/0177061 A1 | 8/2006 | Orsini et al. | |
| 2006/0198368 A1 | 9/2006 | Guichard et al. | |
| 2007/0076709 A1 | 4/2007 | Mattson et al. | |
| 2007/0127719 A1* | 6/2007 | Selander et al. | 380/277 |
| 2007/0186281 A1 | 8/2007 | McAlister | |
| 2008/0075088 A1 | 3/2008 | Carrasco et al. | |
| 2008/0083011 A1 | 4/2008 | McAlister et al. | |
| 2008/0127327 A1 | 5/2008 | Carrasco | |

OTHER PUBLICATIONS

U.S. Office Action in U.S. Appl. No. 11/541,424, mailed on Sep. 18, 2009.

Office Action from U.S. Appl. No. 11/649,336, date of mailing Feb. 27, 2009.

Office Action from U.S. Appl. No. 11/649,336, date of mailing Jul. 9, 2009.

Office Action from U.S. Appl. No. 11/649,336, date of mailing Dec. 16, 2009.

Office Action from U.S. Appl. No. 11/649,336, date of mailing Jun. 3, 2010.

Office Action from U.S. Appl. No. 11/656,077, date of mailing Mar. 16, 2010.

* cited by examiner

FIG. 4

ENFORCING SECURITY GROUPS IN NETWORK OF DATA PROCESSORS

RELATED APPLICATIONS

This application claims the benefit of U.S. Provisional Application No. 60/837,410, filed on Aug. 11, 2006, and is related to co-pending U.S. patent application Ser. No. 11/649,336, filed on Jan. 3, 2007, entitled "Securing Network Traffic Using Distributed Key Generation and Dissemination Over Secure Tunnels." The entire teachings of the above referenced applications are incorporated herein by reference.

BACKGROUND OF THE INVENTION

The present invention relates to securing message traffic in a data network, and more particularly to a service layer approach to implementing group security functions.

The following definitions are used in this document:

"Securing" implies both encryption of data in transit as well as authenticating that the data has not been manipulated in transit.

A "security policy" (or "policy") defines data (or "traffic") to be secured by a source IP address, a destination IP address, a port number, and/or a protocol. They also define the type of security to be performed.

A "security group" is a group of one or more nodes in a network that are assigned a common policy.

A "key" for a secure tunnel is the secret information used to encrypt and decrypt (or to authenticate and to verify) data in one direction of traffic in the secure tunnel.

A "Management and Policy Server" (MAP) is a device that is used to define high level security policies, which it then distributes to one or more Key Authority Points (KAPs).

A "Key Authority Point" (KAP) is a device that generates detailed policies from high level policies, which it then distributes to one or more Policy Enforcement Points (PEPs).

A "Policy Enforcement Point" (PEP) is a device or a function that secures data based on the policies.

Existing Network Security Technology

Data traffic in most computer networks is normally sent unsecured without encryption or strong authentication of the sender and receiver. This allows the traffic to be intercepted, inspected, modified, or redirected. Either the sender or receiver can falsify their identity. In order to allow private traffic to be sent in a secure manner, a number of security schemes have been proposed and are in use. Some are application dependent, as with a specific program performing password authentication, while others, such as TLS, are designed to provide comprehensive security to whole classes of traffic such as HTTP (Hyper-Text Transfer Protocol) and FTP (File Transfer Protocol).

IPsec is a protocol that was developed to address a broader security need. As the majority of network traffic today is over Internet Protocol (IP), IPsec was designed to provide encryption and authentication services to this traffic regardless of the application or transport protocol. This is done, in IPsec transport or tunnel modes. In either mode, the process involves encrypting a data packet (if encryption is required), performing a secure hash (authentication) on the packet, and wrapping the resulting packet in a new IP packet indicating it has been secured using IPsec.

Encryption keys (secrets) and other required configuration information must be exchanged by the parties involved in order for IPsec to work. This is accomplished using Internet Key Exchange (IKE), which is done in two phases.

In a first phase (IKE Phase 1), a connection between two parties is started in the clear. Using public key cryptographic mechanisms, where two parties may agree on a secret key by exchanging public data without a third party being able to determine the key, each party may determine a secret for use in the negotiation. Public key cryptography requires that each party either share secret information (pre-shared key) or exchange public keys for which they retain a private matching key. This is normally done with certificates, e.g., Public Key Infrastructure (PKI). Either of these methods authenticates the identity of the peer to some degree.

Once a secret has been agreed upon in IKE Phase 1, a second phase (IKE Phase 2) may begin and the specific secret and cryptographic parameters of a specific tunnel are developed. All traffic in IKE Phase 2 negotiations is encrypted by the secret from IKE Phase 1. When these negotiations are complete, a set of secrets and parameters for security have been agreed upon by the two parties and IPsec secured traffic may commence.

Security Gateways (SGWs) may be implemented at routers and other internetworking devices to implement IPsec in a tunnel mode, alleviating some of the responsibility for security from end nodes. When a packet is detected at a SGW with a source/destination pair that requires IPsec protection, the secret and other security association (SA) information are determined based on the Security Policy Database (SPD) and IPsec encryption and authentication is performed. The packet is then directed to a SGW that can perform decryption. At the receiving SGW, the IPsec packet is detected, and its security parameters are determined by a Security Packet Index (SPI) in the outer header. This is associated with the SA, and the secrets are found for decryption and authentication. If the resulting packet matches the policy, it is forwarded to the original recipient.

PROBLEMS WITH THE PRIOR ART

General Limitations of IPsec

Although IPsec tunnel mode has been used effectively in securing direct data links and small collections of gateways in networks, a number of practical limitations have acted as a barrier to more complete acceptance of IPsec as a primary security solution throughout the industry.

Configuration of Policies—Using the above approach, each SGW must be configured with each pair of source and destination IP addresses or subnets that must be secured (or allowed in the clear or dropped). For example, 11 SGW units fully meshed, each protecting 10 subnets, would require 1000 policies in the SPD. This is a challenge in terms of the user setting up the policies, the time required to load the policies, the memory and speed difficulties in implementing the policies, and the increase in network time spent performing negotiations and rekey. The time required for initial IKE negotiations in this example may exceed ten minutes.

In addition, even smaller networks would require the user to have a complete knowledge of all protected subnets and their security requirements, and any additions or modifications would need to be implemented at each gateway.

Installation of an IPsec/IKE Stack on Individual PCs—With the variety of available operating systems (Windows XP, XP Service Pack 1 and 2, Linux and all of its kernel releases, etc.) and hardware platforms, a software implementation of the IPsec stack, which is dependent on both of these, must be designed, compiled, tested, and supported for each implementation. Hardware solutions, such as IPsec on a NIC, provide some separation from these issues, but preclude automated remote installation of the IPsec stack.

In addition, the computer with the installation must be configured with the user certificate and the policy configuration. Ideally, the user would be identified in some way other than a machine based certificate, but unfortunately, all existing implementations require the computer to be configured directly, normally by a network security manager. IKE also offers methods for remote access using certificate based authentication combined with RADIUS and XAUTH for the user ID as well as mode configuration to supply the user with a local network identification.

SUMMARY OF THE INVENTION

The present invention is an approach that separates network security functions in into three functional layers. In general, the three layers are respectively responsible for (1) management of security groups and encryption policies; (2) key and policy distribution to security group members, and (3) policy enforcement. In one embodiment, the layers include:

(1) Management And Policy Server (MAP)—responsible for coordinating the definition and coordination of encryption policies and communication entitlements across an enterprise (e.g., which data processors are assigned to which groups, which users are allowed to access which applications, etc.)

(2) Key Authority Point (KAP)—responsible for generation of keys, and secure distribution of keys and policies in the enterprise, such as through Policy Enforcement Points (PEPs).

(3) Policy Enforcement Points (PEPs)—responsible for enforcement of security in the network. The PEPs may be distributed somewhere along the data path, including at network end points (embedded in personal computers, PDAs, storage servers, VPN clients), internetworking devices (routers, gateways, and the like that perform traffic inspection); or other network enabled devices and/or locations. The PEPs perform packet encryption and decryption as well as IPsec header generation on outgoing and incoming packets according to security policies.

By dividing policy management, key generation and exchange, and policy enforcement into these three separate layers, one may solve some of the limitations of existing IPsec/IKE and other network security approaches.

The architecture permits enforcement of data protection across enterprise environments as a security overlay that operates independently of the network. It provides a number of advantages over standard IKE/IPsec security, including but not limited to:

Simplified Configuration of Policies—The definition of policies (local and remote) combined with policy linkage provides simplified secure network definition. This is enhanced by the ability to load individual policies to the PEP(s).

Multicast/Broadcast Traffic—Separating Key Distribution from Policy Enforcement allows for support of these traffic types independent of network protocols.

Firewalls/Intrusion Detection Systems (IDS)—These may be surrounded with a decrypt/encrypt barrier to provide a clear packet to a firewall or IDS. This is supported with a configuration that performs key distribution from a central authority to multiple PEPs.

Resiliency—The invention improves secure network resiliency by providing multiple identically keyed paths and by providing low-state controllers for easy failover. Approaches with complex states in units other than the PEP(s) will offer greater resiliency challenges.

Installation of an IPsec/IKE Stack on Individual PCs—By separating Policy Definition and Key Generation and Distribution from the PEP, the requirements of each PC installation are greatly reduced.

In one method for securing message traffic in a data network using a security protocol, a security policy definition to be applied to traffic in the network is determined at a Management and Policy Server (MAP) within a network. The policy definition includes at least a definition of traffic to be secured and parameters to be applied to the secured traffic. At least one security policy definition from the MAP is received at a Key Authority Point (KAP) within the network. The KAP generates one or more keys to be used in securing the traffic according to the policy definition, and distributes the security policy definition and the keys to two or more peer Policy Enforcement Points (PEPs). The security policy definition and the keys from the KAP are received at a PEP within the network. The PEP receives a network traffic packet, determines if the network traffic packet falls within the definition of traffic to be secured, and applies security processing to the network traffic packet according to the keys and the parameters of the security policy definition.

The MAP may authenticate each KAP and PEP, and provide a visualization of security groups. The security policy definition may include a definition of groups/communities of interest, and may include a definition of membership and permissions of groups.

The KAP may use IPsec to distribute the security policy definition and the keys to two or more peer PEPs, and may communicate with the peer PEPs via an Application Programming Interface (API). The KAP may also monitor the operation of the peer PEPs. It should be noted that in one system, the MAP and KAP may be centralized on a single physical machine.

The PEP may be embedded in a network connected device or may be implemented as a process running on a network appliance. Additionally, the PEP may encrypt outbound packets, may decrypt inbound packets, and may store and process security packet index (SPI) data associated with the packets.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
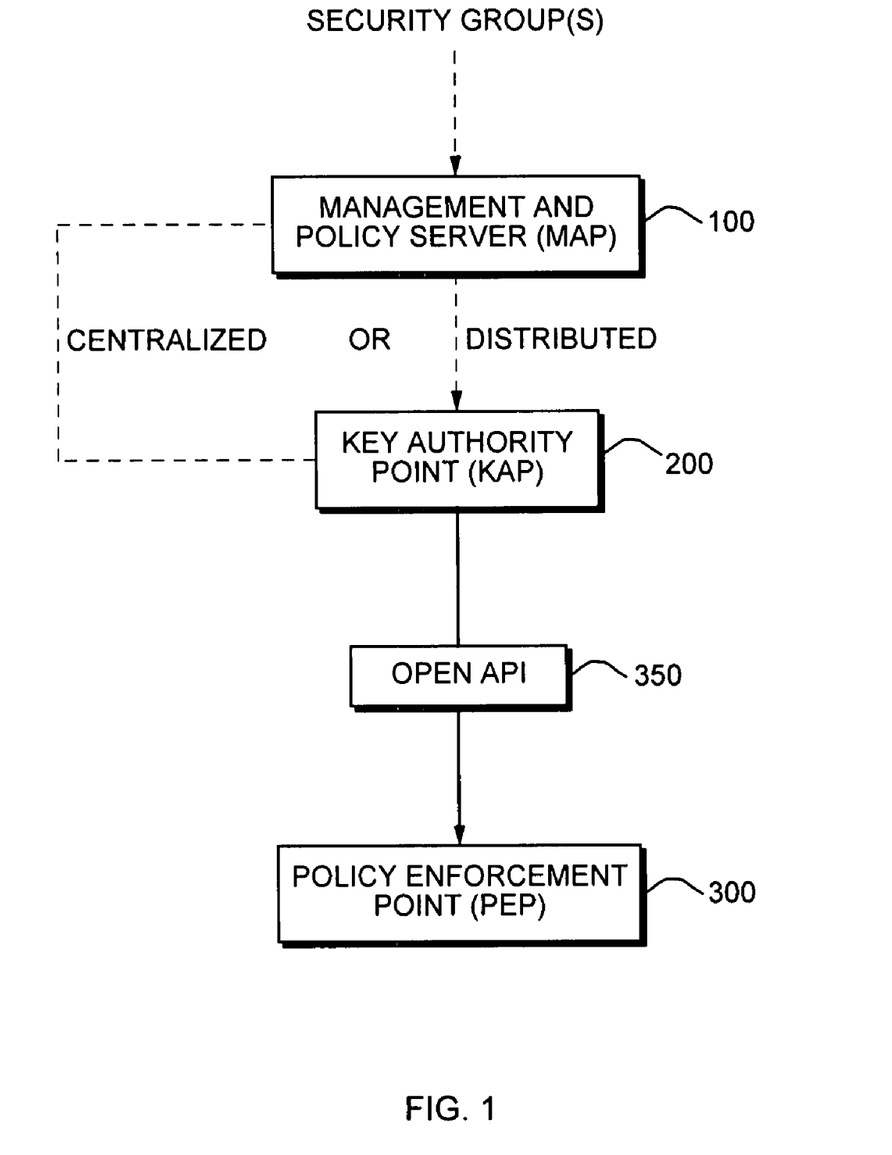
FIG. 1 is a high level functional diagram of a technique for implementing security functions using a Management and Policy Server (MAP), a Key Authority Point (KAP) and a Policy Enforcement Point (PEP) according to the present invention.

FIG. 1 is a high-level diagram illustrating three specific functional layers in a distributed security approach according to the present invention. The three functions include a Management and Policy Server (MAP) 100 (management layer), a Key Authority Point (KAP) 200 (distribution layer), and a Policy Enforcement Point (PEP) 300 (network layer).

Figure 2:
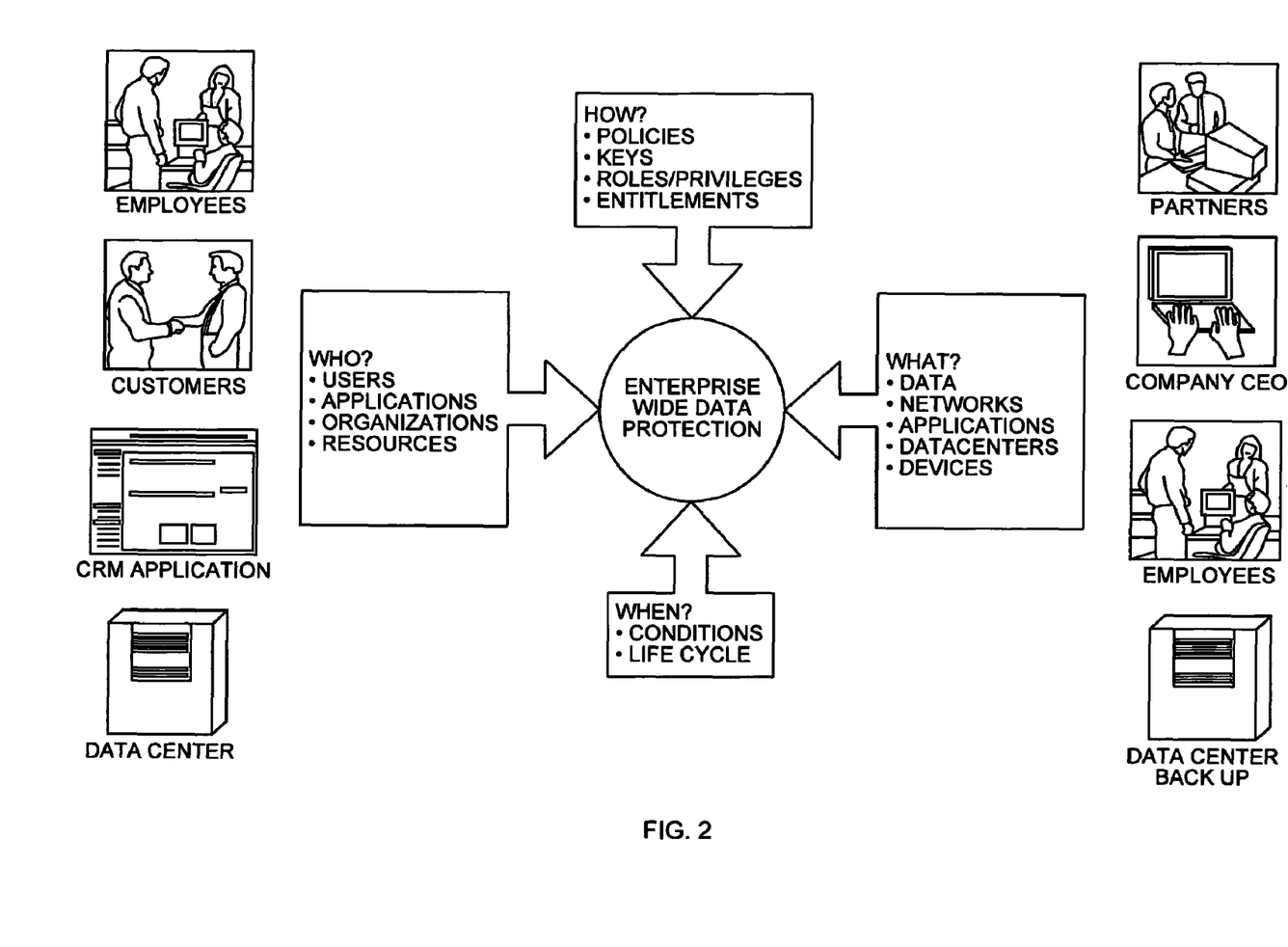
FIG. 2 illustrates functions provided by a MAP.

The MAP 100 is a data processing device, typically a PC or workstation, through which an administrative user may input and configure security policies. The MAP 100 may be thought of as a network management layer device that acts as a secure server storing and providing access to security policies by other elements of the system. The MAP 100 thus provides a single unified interface for definition and enforcement of policies in a network of data processors, such as may be spread across an enterprise. In addition to the functions listed in FIG. 1, a high-level visualization of these and other functions provided by the MAP 100 is illustrated in FIG. 2.

The functions provided by the MAP 100 include authentication of other functional layers, i.e., authentication of each Key Authority Point 200 and Policy Enforcement Point 300 through existing authentication services such as an Authentication, Authorization, and Accounting (AAA) protocol per RFC 2903 (e.g., Diameter, RADIUS, TACAS, etc.); pushing and enforcing policies out to the Key Authority Points 200; and providing support for definition of groups or communities of interest of various elements of the enterprise.

As is key to the present invention, the MAP 100 provides for aggregation and unification of security group definitions across an enterprise. The security groups define permitted (or prohibited) user to user communications, network to network communication, user to application level communication user to data, and so forth.

The MAP 100 thus has an interface to allow for the definition of security group policies that describe how and when members of groups may communicate. These may include management of privileges in defining user roles and group roles, memberships and permissions of particular groups, (i.e., as defined to specific machines, applications or users), assignments of privileged users and applications or data centers which in turn may be rule and policy based.

Security group identity and creation, that is, determining who belongs to which security groups, may be provided in a number of ways. This can be created from user data filled into templates, or imported from business applications, i.e., from human resources or information technology operations in an enterprise. The data may be provided by such other applications as CRM, ARP/SEM software, or LDAP Microsoft Active Directory applications.

Additionally, the MAP 100 provides coordination of provided security group functions, such as network traffic (data) protection, network validation, change control, and the like.

The MAP 100 may also be used to configure the KAP 200 and PEP 300 appliances, (e.g., one function is to configure IPsec tunnel policies to be used for communication between the KAPs 200 and the PEPs 300.)

The MAP 100 user interface may also provide visualization of security groups (i.e., a visualization of what is protected.) Security infrastructure information may also be provided to administrative users to show a snapshot of the present status of the MAP 100, KAPs 200, and PEPs 300 in particular.

The Key Authority Points (KAPs) 200 provide for generation and distribution of keys and security policies to the Policy Enforcement Points (PEPs) 300. The KAPs 200 serve as the authorities for providing encryption keys to the PEPs 300, and may be thought of as a distribution layer. The KAPs 200 may use certain standard types of security policies, such as Security Association (SA), and keys that may be distributed by IPsec to the PEPs 300.

KAPs 200 may also monitor the operation of PEPs 300. Such monitoring may occur through tunnel transport as a secure communication mechanism with the PEPs 300. The KAPs 200 may support tunnel, transport, and network modes, and may support multi-vendor PEPs.

The KAPs 200 are typically located in a different physical machine than the PEPs 300, i.e., PEPs 300, as will be described, may be distributed throughout a network, and even to end nodes themselves. Thus, some mechanism is necessary to provide for the secure transport of keys and other information between the KAPs 200 and PEPs 300. The preferred communication may be through an open Application Programming Interface (API) 350.

Figure 3:
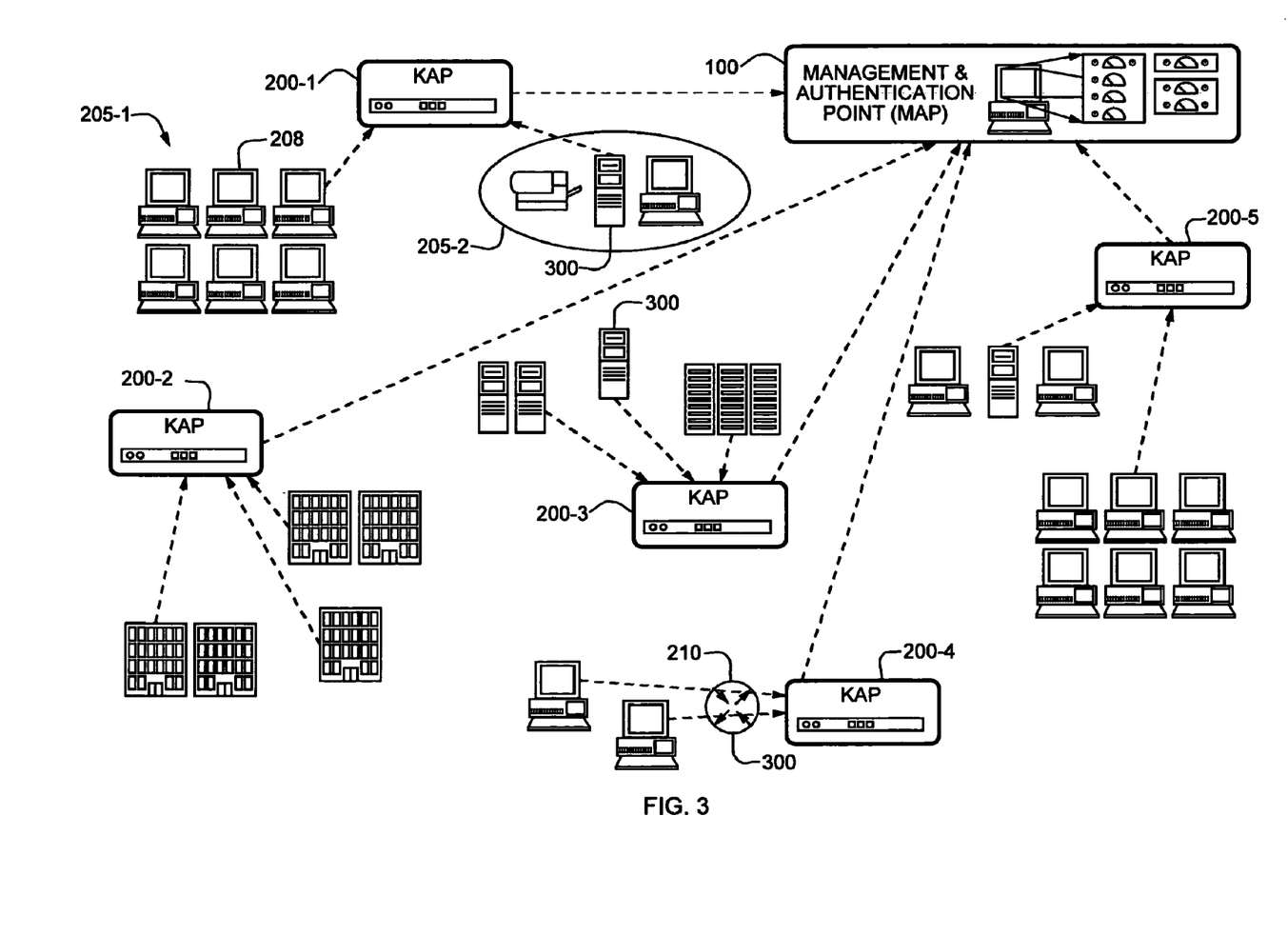
FIG. 3 is a diagram of an enterprise network illustrating typical interconnections between a MAP, a KAP and a PEP.

The KAP 200 and MAP 100 may be centralized on a single physical machine or may be implemented in a distributed fashion. However, in a typical enterprise having a network that spans more than one physical location, as shown in FIG. 3, the MAP 100 is based in a central location such as a headquarters location, and the KAPs 200 are typically distributed at individual locations. In the illustrated example, there are five KAPs 200-1, 200-2, 200-3, 200-4, and 200-5, each responsible for providing the KAP functionality at a given physical network site. It should be understood that a given KAP 200 may actually be responsible for providing KAP functions to more than one physical local area network and/or location, and that FIG. 3 is merely intended for illustration. Thus, the physical local area networks 205-1 and 205-2 are each within the authority of KAP 200-1. Multiple KAPs 200 may also allow for distributed redundant deployment of the KAP distribution functional layer.

Figure 4:
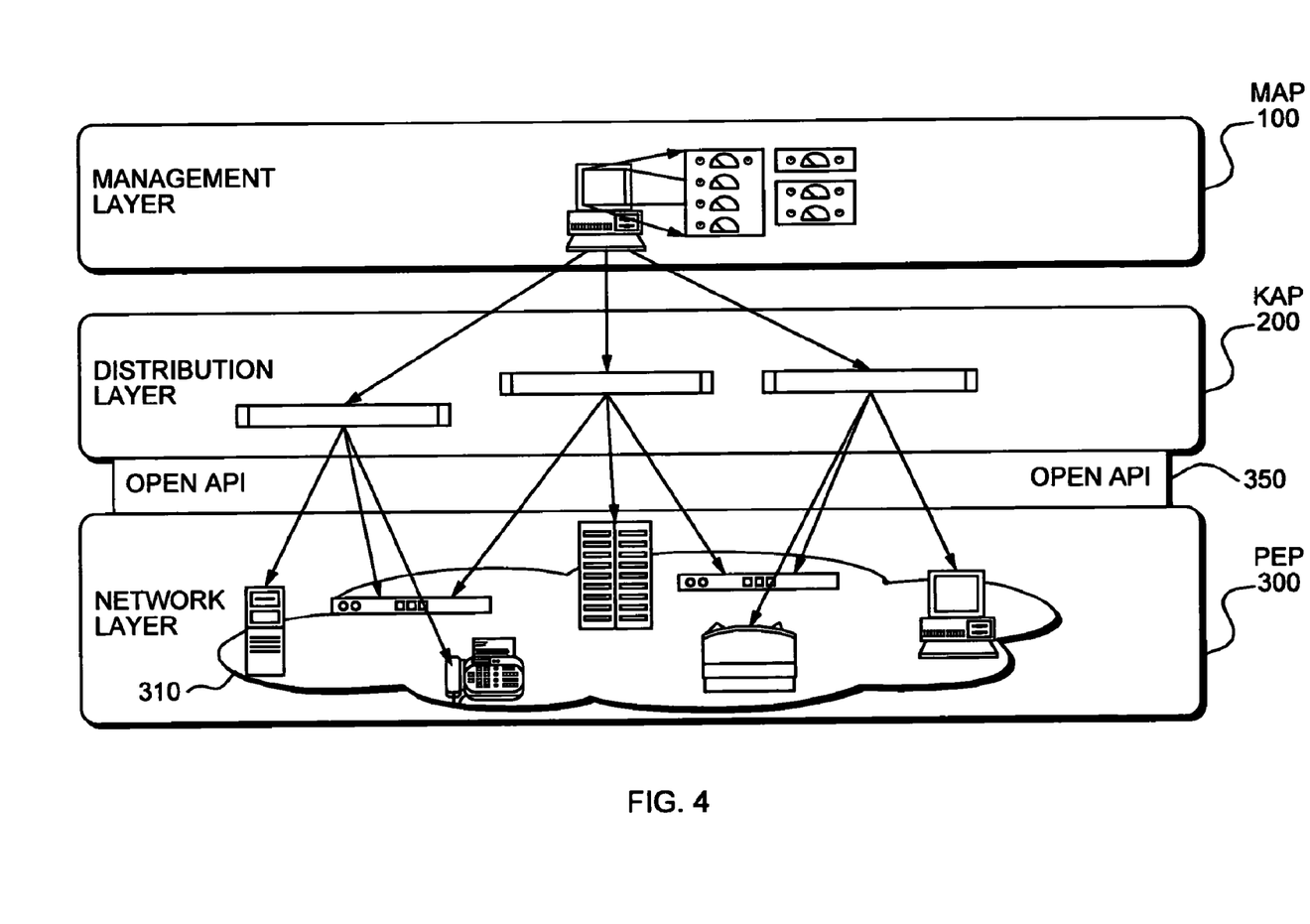
FIG. 4 illustrates the interrelationship between MAP, KAP and PEP hierarchal layers.

PEPs 300 may be hardware or software based and are typically embedded in network connected devices (end nodes), such as PCs 208, or within internetworking devices, such as routers 210. FIG. 4 illustrates where PEPs may reside in a network, including at end nodes 310 that may be typical client computers, such as personal computers (PCs), workstations, Personal Digital Assistants (PDAs), digital mobile telephones, wireless network enabled devices and the like. The nodes 310 may also be file servers, video set top boxes, data processing machines, or other networkable devices from which messages originate and to which message are sent. The policies and keys of the PEPs 300 are enforced by a KAP 200, and each PEP 300 authenticates its corresponding KAP 200. PEPs 300 may support tunnel, transport, and network modes, and may provide multi-vendor support though the API 350.

The message traffic in the network layer typically takes the form of data packets in the well known Internet Protocol (IP) packet format. As is well known in the art, an IP packet may typically be encapsulated by other networking protocols, such as Transmission Control Protocol (TCP), User Datagram Protocol (UDP), or other lower level and higher level networking protocols. It should be understood that other functions and devices may be present in the network and the above configuration is only one example. Since the PEPs 300 are located on the data path, they may also be instantiated as a process running on a hardened network appliance, such as a Secure Gateway (SGW).

Referring to FIG. 1, the PEPs 300 are responsible for a number of tasks, principally for encryption of outbound packets and decryption of inbound packets received on the fast path interface. The PEPs 300 may thus identify packets that need to be secured according to policies, as configured by the KAPs 200. The PEPs 200 may also simply pass through or drop such packets according to such policies.

The PEPs 300 are configured to perform IPsec tasks, such as handling Security Association (SA) information to store and process necessary policies such as Security Packet Index (SPI) data associated with the IPsec packets, and the like, as instructed by the KAPs 200. A PEP may support standard encryption such as AES and three DES, as well as other encryption algorithms.

A typical PEP will support a well-defined command line interface (CLI) via SSH or other security measures. They also leverage NIC (and others) and AAA authentication techniques involving RADIUS, LDAP, TACAS, and others.

As mentioned above, the Key Authority Points (KAP) 200 are primarily responsible for distributing keys and policies to the PEPs 300. They are preferably deployed on hardened appliances or on other target elements in the network, such as devices utilizing Cisco Application Oriented Network (AON). In addition to the functions mentioned above, the KAPs 200 perform functions including at least the following:

Key Generation. This module creates keys to secure a given tunnel. In prior art IKE approaches this is done in coordination with a single peer node as each side agrees on outbound and inbound keys. However, in an embodiment of the present invention, this is performed at the KAP 200 that generates keys for traffic between a number of nodes.

Key Distribution. This module ensures that all connections to the tunnel have the keys necessary to decrypt and encrypt data between the end points. As mentioned previously, this is done in standard IKE as part of the "IKE Phase 2" key exchange between two peers. However, in the present invention, this is performed by the KAPs 200 and PEPs 300 exchanging keys over a secure tunnel. With these techniques, key distribution is still securely protected to prevent eavesdropping and tampering, and to ensure that the exchange occurs with an authorized party.

Policy Distribution. Policies must be installed and/or made available to the Policy Enforcement Points 300. This may be done at configuration or as part of the discovery process. This may also be done on a per-packet basis, as outgoing packets are detected, and have a policy check performed.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for securing message traffic in a data network using a security protocol, comprising the steps of:
   at a Management and Policy Server (MAP) within a network:
   determining a security policy definition to be applied to traffic in the network, the policy definition including at least a definition of traffic to be secured and parameters to be applied to the secured traffic;
   at a Key Authority Point (KAP) within the network:
   receiving at least one security policy definition from the MAP;
   generating one or more keys to be used in securing the traffic according to the policy definition; and
   distributing the security policy definition and the keys to two or more peer Policy Enforcement Points (PEPs) over respective secure tunnels through the network; and
   at a PEP within the network located at a network node that is separate from both the MAP and the KAP and within a device separate from the MAP and the KAP:
   receiving the security policy definition and the keys from the KAP over the secure tunnels through the network;
   receiving a network traffic packet;
   determining, based on the security policy definition, if the network traffic packet falls within the definition of traffic to be secured; and
   applying security processing to the network traffic packet according to the keys and the parameters of the security policy definition.

2. The method of claim 1, wherein the security policy definition includes a definition of groups/communities of interest.

3. The method of claim 1, wherein the security policy definition includes a definition of membership and permissions of groups.

4. The method of claim 1, further comprising the step of:
   at the MAP, authenticating each KAP and PEP.

5. The method of claim 1, further comprising the step of:
   at the MAP, providing a visualization of security groups.

6. The method of claim 1, wherein distributing the security policy definition and the keys to two or more peer PEPs includes distributing the security policy definition and the keys using IPsec.

7. The method of claim 1, wherein distributing the security policy definition and the keys to two or more peer PEPs includes communicating with the peer PEPs via an application programming interface (API).

8. The method of claim 1, wherein the KAP monitors operation of the peer PEPs.

9. The method of claim 1, wherein the MAP and the KAP are centralized on a single physical machine.

10. The method of claim 1, wherein applying security processing to the network traffic packet includes encrypting the packet if it is an outbound packet and decrypting the packet if it is an inbound packet.

11. The method of claim 1, further comprising the step of:
    at the PEP, storing and processing security packet index (SPI) data associated with the packet.

12. The method of claim 1, wherein the PEP is embedded in a network connected device.

13. The method of claim 1, wherein the PEP is implemented as a process running on a network appliance.

14. A system for securing message traffic in a data network using a security protocol, comprising:
    a Management and Policy Server (MAP) within a network, the MAP including a security policy definition to be applied to traffic in the network, the policy definition including at least a definition of traffic to be secured and parameters to be applied to the secured traffic;
    a Key Authority Point (KAP) within the network, the KAP being configured to:
    receive at least one security policy definition from the MAP;
    generate one or more keys to be used in securing the traffic according to the policy definition; and
    distribute the security policy definition and the keys to two or more peer Policy Enforcement Points (PEPs) over respective secure tunnels through the network; and
    a PEP within the network located at a network node that is separate from both the MAP and the KAP and within a device separate from the MAP and the KAP, the PEP being configured to:
    receive the security policy definition and the keys from the KAP over the secure tunnels through the network;
    receive a network traffic packet;
    determine, based on the security policy definition, if the network traffic packet falls within the definition of traffic to be secured; and apply security processing to the network traffic packet according to the keys and the parameters of the security policy definition.

15. The system of claim 14, wherein the security policy definition includes a definition of groups/communities of interest.

16. The system of claim 14, wherein the security policy definition includes a definition of membership and permissions of groups.

17. The system of claim 14, wherein the MAP is further configured to authenticate each KAP and PEP.

18. The system of claim 14, wherein the MAP is further configured to provide a visualization of security groups.

19. The system of claim 14, wherein the KAP is configured to distribute the security policy definition and the keys using IPsec.

20. The system of claim 14, further comprising an application programming interface (API) used for communicating between the KAP and the peer PEPs.

21. The system of claim 14, wherein the KAP is further configured to monitor operation of the peer PEPs.

22. The system of claim 14, wherein the MAP and the KAP are centralized on a single physical machine.

23. The system of claim 14, wherein the PEP is configured to encrypt the packet if it is an outbound packet and decrypt the packet if it is an inbound packet.

24. The system of claim 14, wherein the PEP is further configured to store and process security packet index (SPI) data associated with the packet.

25. The system of claim 14, wherein the PEP is embedded in a network connected device.

26. The system of claim 14, wherein the PEP is implemented as a process running on a network appliance.

27. A non-transitory computer readable medium having computer readable program codes embodied therein for securing message traffic in a data network using a security protocol, the computer readable medium program codes performing functions comprising:
- a routine for determining, at a Management and Policy Server (MAP) within a network, a security policy definition to be applied to traffic in the network, the policy definition including at least a definition of traffic to be secured and parameters to be applied to the secured traffic;
- a routine for receiving, at a Key Authority Point (KAP) within the network, at least one security policy definition from the MAP;
- a routine for generating, at the KAP, one or more keys to be used in securing the traffic according to the policy definition;
- a routine for distributing the security policy definition and the keys from the KAP to two or more peer Policy Enforcement Points (PEPs) over respective secure tunnels through the network;
- a routine for receiving, at a PEP within the network located at a network node that is separate from both the MAP and the KAP and within a device separate from the MAP and the KAP, the security policy definition and the keys from the KAP over the secure tunnels through the network;
- a routine for receiving, at the PEP, a network traffic packet;
- a routine for determining, based on the security policy definition, if the network traffic packet falls within the definition of traffic to be secured; and
- a routine for applying security processing to the network traffic packet according to the keys and the parameters of the security policy definition.

* * * * *